(12) United States Patent
Kientz et al.

(10) Patent No.: US 6,299,114 B1
(45) Date of Patent: Oct. 9, 2001

(54) ASSEMBLING DEVICE WITH ANGULAR ADJUSTMENT AND METHOD USING SAME

(75) Inventors: Jean-Marc Kientz, Villeparisis; Alain Perrin, Bobigny, both of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/424,749

(22) PCT Filed: Oct. 18, 1999

(86) PCT No.: PCT/FR99/02534

§ 371 Date: Nov. 29, 1999

§ 102(e) Date: Nov. 29, 1999

(87) PCT Pub. No.: WO00/23304

PCT Pub. Date: Apr. 27, 2000

(30) Foreign Application Priority Data

Oct. 20, 1998 (FR) .................................................. 98 13188

(51) Int. Cl.[7] .................................................. A47B 96/06
(52) U.S. Cl. ................... 248/231.21; 248/227.4; 280/124.152; 403/373; 403/374.3; 403/344
(58) Field of Search .................. 280/124.1, 124.106, 280/124.149, 124.152; 248/74.1, 227.4, 214, 231.21; 403/373, 374.1, 374.2, 374.3, 344

(56) References Cited

U.S. PATENT DOCUMENTS

| | | | |
|---|---|---|---|
| 3,578,821 | * | 5/1971 | Guettier . |
| 3,941,431 | * | 3/1976 | Giordano et al. . |
| 4,616,949 | * | 10/1986 | Kellner .............................. 403/344 X |
| 5,009,376 | * | 4/1991 | Usui ..................................... 248/74.1 |
| 5,090,833 | * | 2/1992 | Oertle et al. .......................... 403/373 |
| 5,368,326 | * | 11/1994 | Turck et al. . |
| 5,580,184 | * | 12/1996 | Riccitelli ........................... 403/373 X |

FOREIGN PATENT DOCUMENTS

| | | | |
|---|---|---|---|
| 0631891-A1 | * | 1/1995 | (EP) . |
| 1566691 | * | 3/1968 | (FR) . |
| 2232467 | * | 6/1973 | (FR) . |
| 2445250 | * | 12/1979 | (FR) . |

* cited by examiner

Primary Examiner—Anita King
Assistant Examiner—Korie Chan
(74) Attorney, Agent, or Firm—Leo H McCormick, Jr; Warren Comstock

(57) ABSTRACT

A method of attaching a spring (5) to a brake pressure equalizing device (6) by securing a clamping collar (2) to an attachment bar (1) of a vehicle. The attachment bar (1) has a circular section which connected to a flat (11,12) whereas the clamping collar (2) is an open and deformable ring (20) created by a first lug (21) being joined to a second lug (22). A profiled insert piece (4) has an internal shape which matches the profile of the circular section and flat of the attachment bar and an external shape which matches the deformable ring (20) is inserted between the attachment bar (1) and deformable ring (20). A nut (31) is connected to a screw (3) that extends between the first lug (21) and the second lug (22) and the spring is attached to the second lug (22) and brake pressure equalizing device (6). The clamping collar (2) is rotated on the profile insert piece (4) until a desired tension is achieved in the spring (5). The nut (31) is thereafter tightened to bring the first lug (21) toward the second lug (22) and bring the ring (20) into frictional engagement with the profile insert piece (4) to fix the location of the attachment collar (2) with respect to the attachment bar (1).

3 Claims, 2 Drawing Sheets

ASSEMBLING DEVICE WITH ANGULAR ADJUSTMENT AND METHOD USING SAME

The present invention relates to the field of assembly and adjustment, particularly in the field of mounting components on motor vehicles.

More specifically, the invention relates in particular to an assembly device of the type comprising: an attachment bar having, over a given length, a partially circular cross section including at least one flat and having a minimum dimension and a maximum dimension; and a clamping collar comprising two lugs which can be brought closer together by tightening a screw which passes through them, the lugs before the screw is tightened being spaced apart by a distance greater than the minimum dimension and less than the maximum dimension, it thus being possible for the clamping collar to be mounted on the bar before the screw is inserted, by a transverse movement with respect to this bar.

BACKGROUND OF THE INVENTION

Devices of this type are well known in the prior art in various fields and are used in particular to allow the springs of brake-pressure equalizing devices to be attached to the vehicle.

One problem encountered, in this application in particular, lies in the fact that the assembly devices currently used offer no possibility of rotating the clamping collar about the bar and therefore no means of adjusting the length of the spring and in consequence no means of adjusting the tension of the latter either.

SUMMARY OF THE INVENTION

The invention falls within this context and its object is to propose a simple solution to this problem.

To this end, the assembly device of the invention, which in other respects is in accordance with the definition given in the above preamble, is essentially characterized in that the clamping collar comprises an open and deformable ring which is extended to form the two clamping lugs, this ring offering a substantially circular internal housing of diameter greater than the maximum dimension, and in that the device further comprises a profiled insert piece which has an internal profile shaped to at least partially mate with the cross section of the bar and an external profile shaped to at least partially mate with the internal housing of the ring, it thus being possible for this profiled piece to be inserted between the bar and the ring by a longitudinal movement with respect to the bar.

The bar may have two flats, in which case the profiled piece has a U-shaped cross section.

In all cases, the external profile of the profiled piece is preferably at least partially ridged.

The invention also relates to a method for attaching to a vehicle a spring of a brake-pressure equalizing device, this method employing a device as previously defined and essentially characterized in that it comprises the operations that consist in fitting the clamping collar around an anti-roll bar of the vehicle, this bar being used to act as an attachment bar; attaching the spring to one lug of the clamping collar; rotating the clamping collar about the bar until a final rotated position of the collar is obtained in which the spring is stretched to a predetermined length; and tightening the clamping collar in its final rotated position, using the screw.

Other features and advantages of the invention will emerge clearly from the description thereof given hereafter by way of non-limiting indication, with reference to the appended drawings.

DETAILED DESCRIPTION OF THE INVENTION

Figure 1:
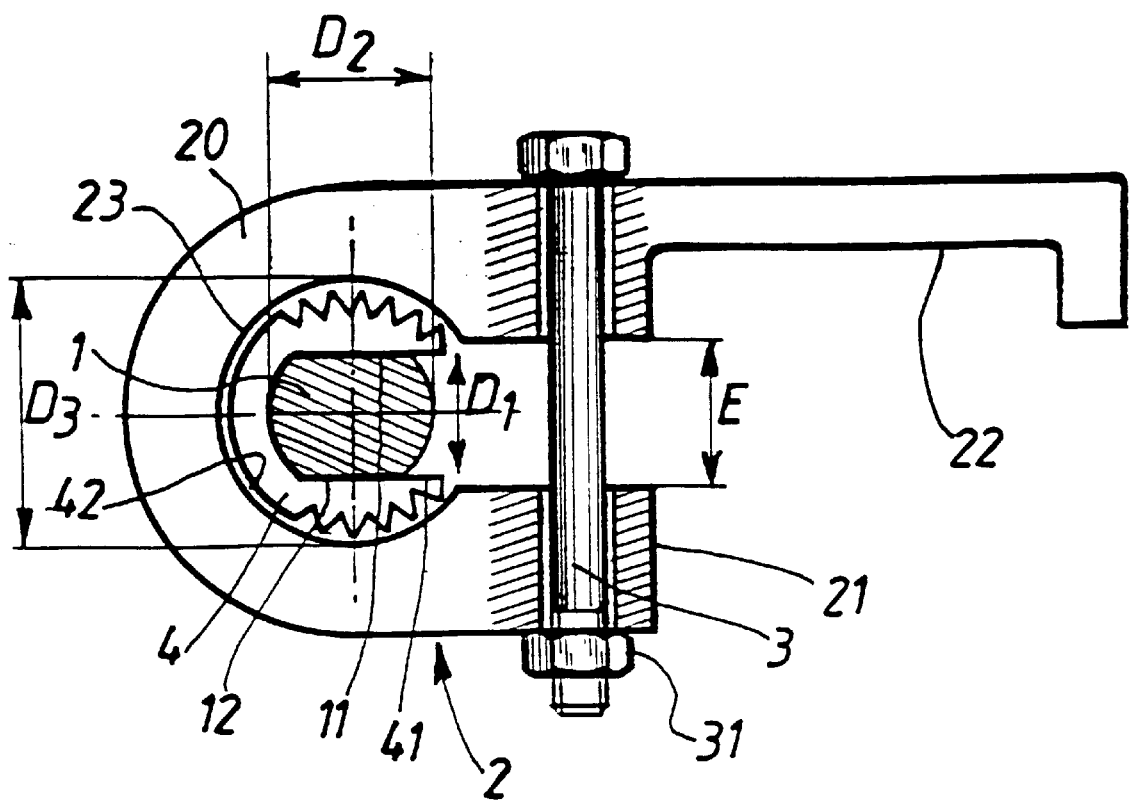
FIG. 1 is a side view in part section of a device in accordance with the invention.

As FIG. 1 shows, the assembly device of the invention essentially comprises an attachment bar 1 and a clamping collar 2 equipped with two tightening lugs 21, 22.

The attachment bar 1 has, over a given length, a cross section which is generally partially circular, which is the one illustrated in FIG. 1, and which includes one or two flats 11, 12 and has a minimum dimension D1 and a maximum dimension D2.

The lugs 21, 22 of the clamping collar 2 have passing through them a screw 3 which can be tightened, possibly by means of a nut 31, in order to bring these lugs closer together and thus clamp the collar 2 onto the bar 1.

Before the screw is tightened, the lugs 21, 22 of the clamping collar 2 are spaced apart by a distance E that is greater than the minimum dimension D1 of the section of the bar 1 and less than the maximum dimension D2 of this section it thus being possible for the clamping collar 2 to be mounted on the bar 1, before the screw 3 is inserted, by a transverse movement of the collar 2 with respect to the bar 1.

According to the invention, the clamping collar 2 comprises a ring 20, and the device further comprises a profiled insert piece 4 intended to be inserted between the bar 1 and this ring 20.

The ring 20 is open and deformable, is extended to form the two clamping lugs 21, 22, and offers a substantially circular internal housing 23 of diameter D3 greater than the maximum dimension D2.

The profiled insert piece 4 which, for example, is made of a metallic material, has an internal profile 41 shaped to at least partially mate with the cross section of the bar, and an external profile 42 shaped to at least partially mate with the internal housing 23 of the ring, this external profile 42 preferably being ridged at least over part of its length so as to guarantee that the collar 2 will not rotate on the bar 1.

As the person skilled in the art will readily understand, it is thus possible to insert the profiled piece 4 between the bar 1 and the ring 2 by a movement of bringing the collar 2 and the profiled piece 4 closer together, this movement being performed in the lengthwise direction of the bar.

In cases where the bar has two flats 11, 12, the profiled piece 4 has a U-shaped cross section as illustrated in FIG. 1.

Figure 2:
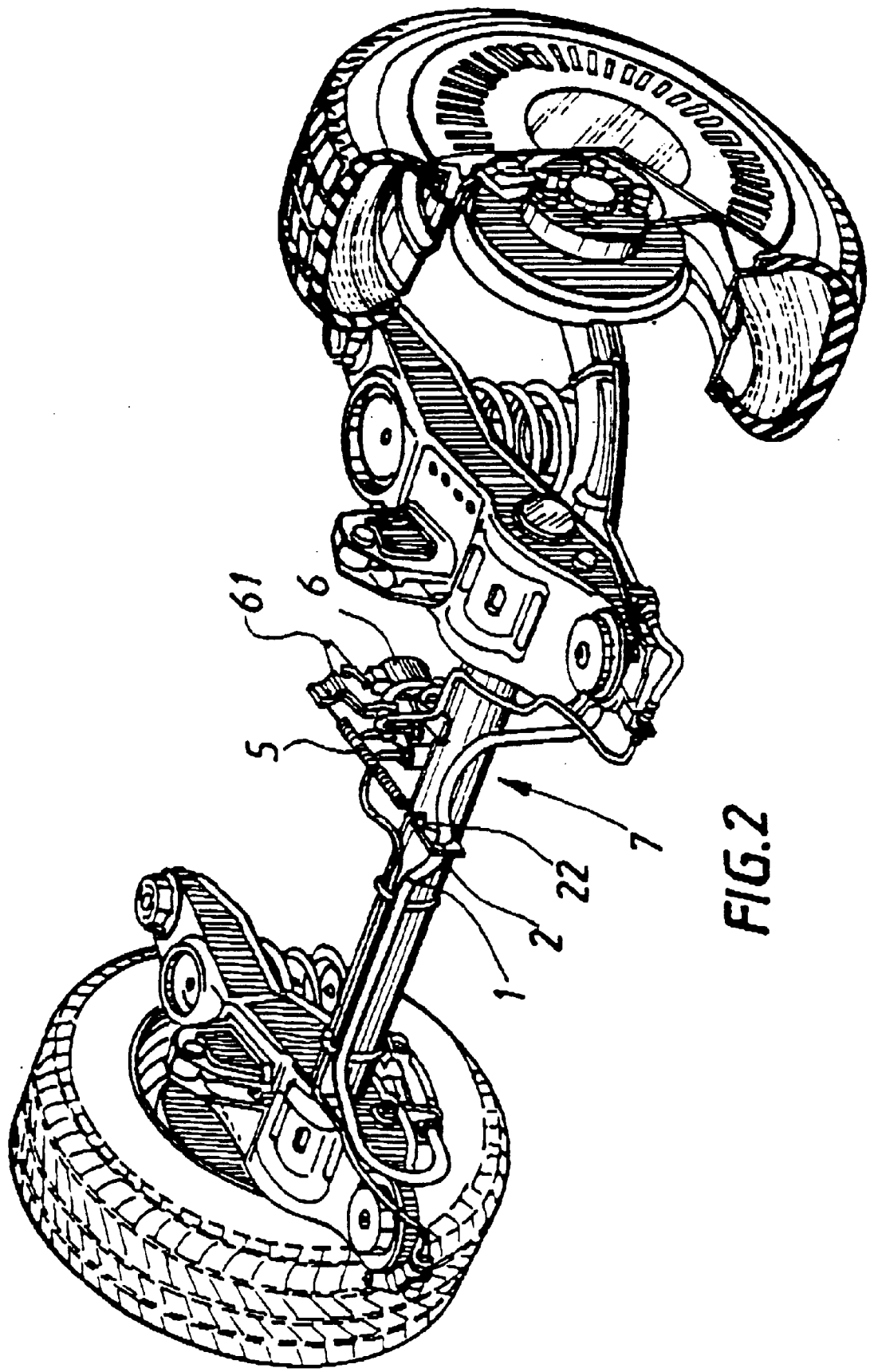
FIG. 2 is a view in perspective illustrating the favoured application of the device of FIG. 1.

The invention is particularly applicable to attaching to a vehicle a spring 5 of a brake-pressure equalizing device 6, this favoured application being illustrated in FIG. 2.

In this case, the equalizing device 6 is secured to the axle 7 of the vehicle, and the problem to be solved consists in attaching, to the anti-roll bar 1 of this vehicle, the spring 5 which is conventionally used to transmit to the lever 61 of the equalizing device 6 a force that depends on the loading of the vehicle and is suitable for altering the operation of this equalizing device 6.

The method therefore consists in fitting the clamping collar 2 around the anti-roll bar 1, which is used as an attachment bar; attaching the spring 5 to one lug 22 of the clamping collar 2; rotating the clamping collar 2 about the bar 1 until a final rotated position of the collar 2 is obtained in which the spring 5 is stretched to a predetermined length; and tightening the clamping collar 2 in its final rotated position, using the screw 3, by turning the screw or the nut 31 as appropriate.

What is claimed is:

1. A method of attaching a spring to a brake-pressure equalizing device for use in a vehicle comprising the steps of:

fitting a clamping collar around an attachment bar of the vehicle, said attachment bar having a peripheral surface with a partially circular cross section (D2) including at least one flat to create a cross section (D1), said clamping collar having a first lug spaced apart from a second lug by a distance (E) which is greater than a minimum dimension equal to cross section (D1) but less than a maximum dimension equal to cross section (D2), said clamping collar defining an open and deformable ring which extends from said first lug to said second lug with a substantially circular internal surface having a diameter (D3) which is greater than the circular cross section (D2), inserting a profiled piece between said attachment bar and said deformable ring through a longitudinal movement with respect to said attachment bar, said profiled insert piece having an internal shape which mates with said peripheral surface of said attachment bar and an external shape which mates with said circular internal surface (D);

passing a screw through said first lug and said second lug;

attaching the spring to said first lug and to the brake-pressure equalizing device;

rotating the clamping collar about said attachment bar until a final position of the clamping collar is obtained in which said spring is stretched to a predetermined length; and tightening said screw to bring said first lug toward said second lug and correspondingly said circular internal surface (D) into engagement with said external shape of said profile piece to fix the location of said collar with respect to said attachment bar.

2. The method as recited in claim 1 wherein said step of inserting the profile piece further comprising the step of mating flat portions of said profile piece having a U-shaped cross-section to a respective first and second flats on the attachment bar.

3. The method as recited in claim 1 wherein the clamping collar is further prevented from rotating on the attachment bar in the step of tightening of said screw by said external shape of said profile piece being at least partially ridged.

* * * * *